United States Patent [19]
St. Clair

[11] 3,729,652
[45] Apr. 24, 1973

[54] SOLID STATE SURGE SUPPRESSOR

[75] Inventor: John G. St. Clair, Folcroft, Pa.

[73] Assignee: General Electric Company, Philadelphia, Pa.

[22] Filed: June 22, 1972

[21] Appl. No.: 265,288

[52] U.S. Cl...................317/16, 317/31, 317/33 SC, 317/33 C, 317/41, 317/50, 317/61.5
[51] Int. Cl...............................................H02h 3/22
[58] Field of Search..............317/16, 31, 41, 33 SC, 317/33 C, 50, 61.5; 328/151

[56] References Cited

UNITED STATES PATENTS

| | | |
|---|---|---|
| 3,246,206 | 4/1966 | Chowdhuri............................317/16 X |
| 3,309,575 | 3/1967 | Lee et al..............................317/61.5 |
| 3,375,405 | 3/1968 | Fallon et al...........................317/16 |
| 3,435,288 | 3/1969 | Greenwood..........................317/11 B |

Primary Examiner—James D. Trammell
Attorney—J. Wesley Haubner et al.

[57] ABSTRACT

Solid-state circuitry for arresting surges on a D-C power line. The circuitry includes a non-linear resistor connected in series with a normally nonconductive thyristor across the power line. The thyristor is automatically triggered into conduction in response to a signal which is a function of the magnitude and the rate of rise of the surge. The thyristor is rendered nonconductive by an oscillatory circuit including a capacitor when the surge voltage drops below a first predetermined level if the voltage on the capacitor is above a second predetermined level.

8 Claims, 4 Drawing Figures

SOLID STATE SURGE SUPPRESSOR

BACKGROUND AND OBJECTS OF THE INVENTION

The present invention relates to electrical protective devices and more particularly to solid stage voltage surge responsive protecting devices for direct current power systems. The following published art, now known to applicant, is exemplary of prior art approaches relevant in this area of technology: U.S. Pat. Nos. 3,230,459—Loya; 3,246,206—Chowdhuri; 3,309,575—Lee et al; 3,375,405—Fallon et al; 3,435,288—Greenwood; and 3,569,784—Carrol.

In many D-C power systems, surge suppressing circuitry is commonly connected across the power source to protect the system and its components from external (e.g., lightning) and internal (e.g., switching) surges. This is particularly true in power systems utilizing solid stage components such as diodes and thyristors since such components do not have much margin for safely withstanding voltages above their normal operating voltage. Accordingly, protection of a system against transient overvoltages or voltage surges requires that the suppressing circuitry be able to reduce the transient overvoltage to safe values below the breakdown level of the system components.

In the above noted Chowdhuri patent, which is assigned to the same assignee as my invention, there is disclosed solid stage surge suppressing circuitry which may be connected across a D-C bus and which is adapted to quickly suppress any surge arising thereon. In several embodiments disclosed therein a solid stage switching element and a non-linear resistor having a negative current-resistance characteristic are connected in series with one another across a D-C bus in a power system. In the absence of a voltage surge in the power system the switching element is normally non-conductive, thereby ensuring that the surge suppressor does not drain any power from the system power source. Should a voltage surge develop in the power system and attain a preestablished magnitude the switching element is automatically rendered conductive to provide a path through which the surge current flows and is dissipated. As the voltage on the non-linear resistor builds up and exceeds the bus voltage the magnitude of the surge is reduced and its energy is dissipated as heat in the non-linear resistor.

As per Chowdhuri's disclosure a buffer capacitor is connected in shunt with the non-linear resistor in order to disconnect the suppressor from the bus after dissipation of the surge. To that end Chowdhuri notes that immediately after the surge is dissipated the voltage on the capacitor is equal to the voltage drop across the non-linear resistor due to the surge and is of opposite polarity to the polarity of the switching element thereby rendering the switching element non-conductive. This action prevents the flow of line current through the surge suppressor after the surge has been dissipated.

In some D-C power systems (e.g., systems having large line inductance and high available surge current levels), I have found that if the voltage level at which the switching elements of prior art surge suppressors are rendered conductive is too low, the voltage which appears on the surge suppressor may be insufficient to drive the surge current to zero quickly. Accordingly, the suppressor will remain on longer. The longer the suppressor remains on in arresting the surge, the more energy is drawn from the system voltage source, which energy will flow through the suppressor's conducting non-linear resistor. This action may unnecessarily heat the non-linear resistor.

If, on the other hand, the voltage level at which the surge suppressor switching element is rendered conductive is established at a relatively high level so as to enable the surge to be arrested quickly, damage to the system components may result in arresting surges having a fast rate of rise (e.g., 3 volts per microsecond), such damage being caused by excessive overshoot on the non-linear resistor.

It is a general object of my invention to provide a solid stage surge suppressor particularly adapted for use in electrical power systems in which voltage surges having differing rates of rise may occur.

It is a further object of my invention to provide, in a solid state surge suppressor including a non-linear resistor, a novel turn on circuit adapted for turning the suppressor on without the danger of excess heating of or excess voltage overshoot on the non-linear resistor.

In some circumstances solid stage surge suppressors utilizing buffer capacitors to disconnect the suppressor from the bus like those disclosed by Chowdhuri may exhibit problems in turning off. For example, if the surge energy is relatively low, the voltage on the buffer capacitor connected in shunt with the non-linear resistor may not sufficiently exceed the voltage on the D-C bus to ensure the successful turn off of the solid state switching element. In such an event the suppressor will drain power from the D-C power supply. This is particularly true if the solid state switching element is a thyristor. To obviate such problems turn off or commutating circuitry can be provided to positively turn off the solid state switching element in the surge suppressor thereby effectuating the disconnect of the suppressor from the system power supply.

As is known a thyristor is a solid state device including a body or wafer having four distinct layers of semiconductor material (silicon) with contiguous layers being of different conductivity types to form three back-to-back PN (rectifying) junctions in series. The semiconductor body is disposed between a pair of main current carrying electrodes. When connected in series with a load impedance and a source of forward voltage, a thyristor will ordinarily block appreciable current flow between its main electrodes until it is triggered by the injection of a sufficient number of minority carriers into certain of its junction areas, whereupon it abruptly switches from the high impedance to a very low impedance, forward con-ducting, turned-on state whereby load current conduction commences. When forward current flowing through the device is subsequently reduced below a certain holding level, the device begins to turn off, whereupon load current conduction therethrough ceases. In an A-C system the device will automatically turn off at the end of each periodic con-ducting interval when the load current goes to zero. In a D-C system, however, turn-off means, commonly known as commutation means, must be provided to force a current zero through the device to enable it to turn off. A short period of time after termination of current through the device a sufficient number of minority carriers will have been swept from the junctions thereof and the device will regain its forward voltage blocking ability. This short period of time is known as the "turn off" time of the device and is a function of several parameters inherent in the device (e.g., the impurity concentration in the semiconductor layers).

When a thyristor is used as the switching element in a solid state surge suppressor for a D-C system it is of major importance to ensure that the interval between a cessation of current through the device and the reapplication of forward voltage thereon, which interval is determined by the configuration of the turn-off circuit, is longer than the inherent turn-off time of the device to ensure that once turned off the device remains off until it is subse-quently retriggered.

Accordingly, it is a further object of my invention to provide a solid stage surge suppressor adapted for use in a D-C power system and including turn off circuitry to ensure that the suppressor is positively disconnected from the system after suppressing any surges which may arise therein.

SUMMARY OF THE INVENTION

In carrying out my invention in one form I provide in a D-C power system a solid state surge suppressor including a thyristor connected in series with a non-linear resistor. Turn-on circuitry, operative in response to the detection of a system voltage surge, is provided to render the switch conductive, which action connects the non-linear resistor in the system for arresting the surge. The turn on circuitry is arranged to turn the thyristor on at lower surge voltage levels for fast rising surges than for slow rising surges. Turn-off circuitry is provided to turn the thyristor off when sufficient surge energy has been dissipated. The turn off circuitry includes commutation means operative when actuated from a conditioned state for driving the current flowing through the thyristor to zero and means for actuating the commutating means. The actuating means includes circuitry which ensures that the commutating means is not actuated until it is conditioned and until the system voltage drops below a predetermined level.

BRIEF DESCRIPTION OF THE DRAWINGS

My invention will be better understood and its various objects and advantages will be more fully appreciated from the following description taken in conjunction with the accompanying drawing in which.

DETAILED DESCRIPTION OF THE PREFERRED EMBODIMENT

Figure 1:
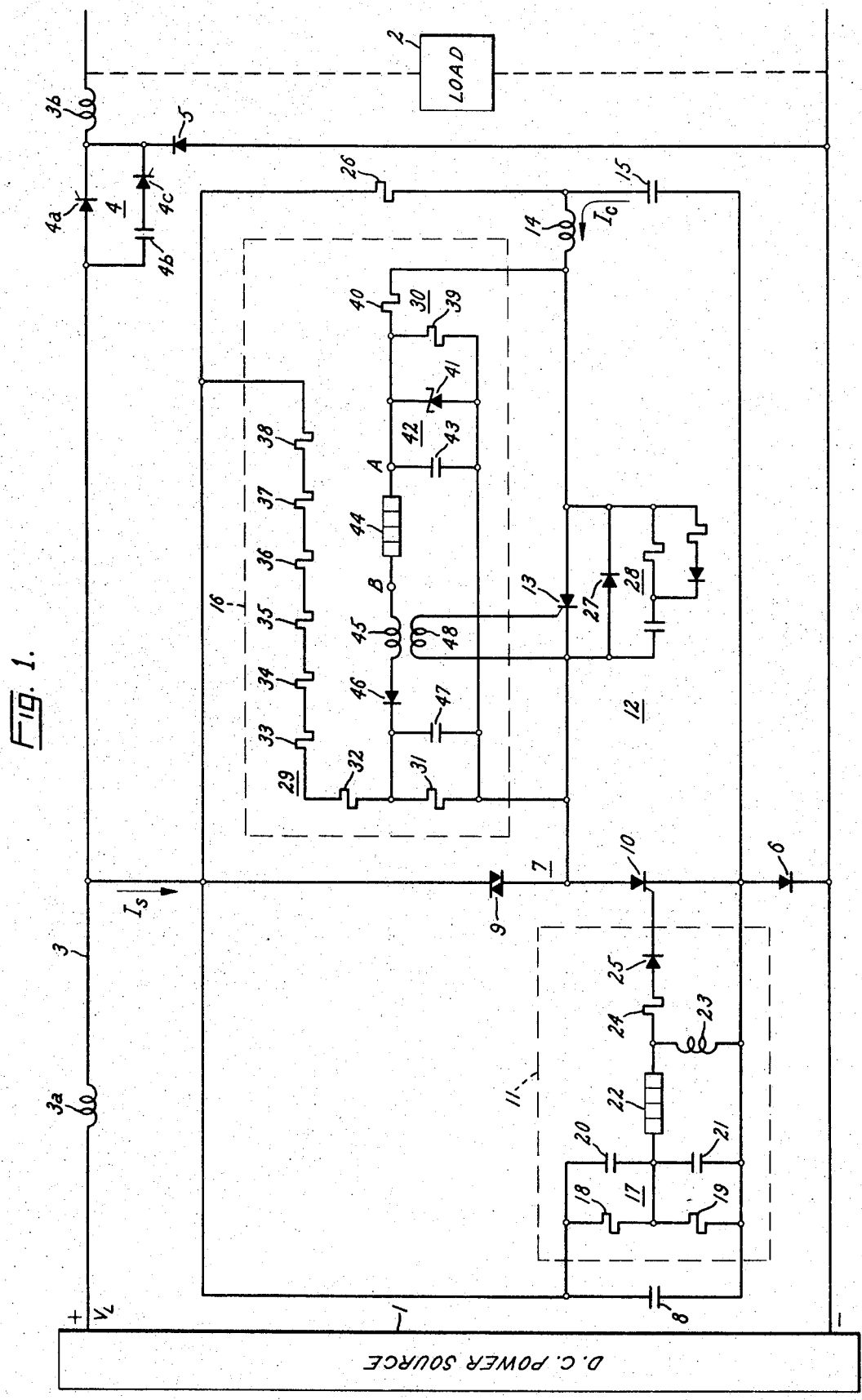
FIG. 1 is a schematic diagram of a solid state surge suppressor in accordance with my invention.

Referring to FIG. 1 there is shown a D-C power system including a D-C power source 1 for supplying power to a remote load 2 via a D-C bus 3. A static switch or circuit breaker 4 is connected in the bus 3 between the source 1 and the load 2 and is adapted for interrupting the flow of current to the load upon command. The static switch 4 is shown schematically as including a power thyristor 4a shunted by a circuit including a capacitor 4b and a serially connected thyristor 4c. Triggering means (not shown) are provided to render thyristor 4a conductive and thereby enable current to flow from the power source to the load.

Once conductive thyristor 4a will continue to conduct until the level of current flowing therethrough drops below a predetermined threshold level. Since the circuit shown in FIG. 1 is a D-C circuit means are provided to drive the current flowing through the power thyristor to zero (i.e., create an artificial current zero) to turn the thyristor off. Such turn off means are known in the art as commutating means and they can take many forms. One common form is shown in FIG. 1 and includes capacitor 4b, called a commutating capacitor, and a serially connected thyristor 4c, called a commutating thyristor. The commutating capacitor is charged to the potential whose polarity is shown. In U.S. Pat. No. 3,098,949–Goldberg there is shown and claimed means for charging the commutating capacitor of a static switch. The commutating thyristor is poled in opposition to the polarity of the power thyristor 4a and is adapted to be rendered conductive upon being triggered by associated trigger means (not shown).

Operation of the commutating means is as follows: upon being triggered, the commutating thyristor begins conducting whereupon energy stored in the commutating capacitor discharges in the reverse direction through the power thyristor. This action quickly drives the load current flowing through the power thyristor to zero whereupon it turns off and the flow of load current therethrough is interrupted. As the power thyristor turns off load current, which heretofore had been flowing through it, is diverted through the commutating circuit thereby charging the commutating capacitor. When the commutating capacitor is charged up fully the further flow of current therethrough is precluded and the flow of current to the load is interrupted.

The commutating thyristor triggering means is controlled by manual means (not shown) as well as by automatic fault current detecting means (not shown). The manual means is operative for effectuating the interruption of the flow of normal load current through the power thyristor in response to a manual OFF signal whenever such interruption is desired. The automatic fault current detecting means is operative for effectuating the interruption of the flow of an abnormal or fault current through the power thyristor in high speed response to its detection.

The power system shown schematically in FIG. 1 may represent various types of power systems such as traction systems (i.e., electric powered railways), underground mine power systems, etc. In such systems the D-C bus between the power source 1 and the static switch 4 is relatively long.

As is known all electrical power lines exhibit some inherent inductance, called the line inductance. The line inductance between the power source 1 and the static switch 4 in the power system of FIG. 1 is shown schematically as lumped inductor 3a and is called the line-side inductance. The line inductance between the static switch and the load 2 is called the load-side inductance and is shown schematically as lumped inductor 3b. A free wheeling diode 5 connected to the load side of the switch enables current stored in the load-side inductance to circulate and to safely dissipate upon the opening of static switch 4.

In power systems having relatively long lines between the power source and the static switch, as is the case in electric traction or underground mine electrical systems, the line-side inductance may be quite high (e.g., 3 millihenries). Accordingly, a large amount of energy (equal to ½ LI², L being the line-side inductance and I being the current flowing therethrough) will be stored in the line-side inductance during the period that the static switch 4 is conducting. When, in response to a command, the static switch is turned off the stored inductive energy will try to discharge current through the static switch. This action results in charging the commutating capacitor to a voltage level equal to the $\sqrt{L/C} \times I$ (L being the large line-side inductance, I being the current therethrough and C being the commutating capacitor capacitance). If the commutating capacitor is made large enough (i.e., has a large value of capacitance) the voltage to which it will be charged can be kept relatively low. However, commutating capacitors large enough to keep the voltage thereon relatively low in large power systems (e.g., 600 volts) are expensive. If smaller commutating capacitors are utilized, the voltage which will build up on the commutating capacitor due to the stored inductive energy may exceed the breakdown voltage of the power thyristor thereby causing it to break over and become conductive. Such action can result in damage to the thyristor.

In order to protect the power thyristor of the static switch from the application thereto of excessive voltage levels without necessitating the use of large and expensive commutating capacitors, a surge suppressor 5 is connected in series with a diode 6 across the D-C bus in the vicinity of the static switch.

The surge suppressor 5 is the subject matter of my invention and is a solid state device adapted for the suppression of transient switching surges (e.g., surges which result from the opening of static switch 4) as well as externally imposed surges (e.g., lightning surges).

The basic elements of my D-C surge suppressor are a diverting circuit 7 including a buffer capacitor 8 shunting the series connection of a non-linear resistor 9 and a controllable switching element or thyristor 10, a turn on circuit 11 for the switching element 10 to connect the diverting circuit 7 to the D-C bus 3, a commutating circuit 12 including a commutating thyristor 13 and an inductor 14-capacitor 15 composed oscillatory circuit to turn off the controllable switching element 10 so as to disconnect the diverting circuit from the D-C bus upon the dissipation of the surge and a triggering circuit 16 for the commutating circuit 12.

The non-linear resistor displays a negative current-resistance characteristic (i.e., high resistance at low currents and low resistance at high currents). Silicon-carbide resistors display such a characteristic. One type of silicon-carbide resistor made by General Electric Company under the trade name of "Thyrite" has been found to be desirable and has been used as an embodiment of applicant's invention.

The surge suppressor operates generally as follows: upon the occurrence of a voltage surge (e.g., switching surge or externally originated surge) attaining a preselected triggering level which is a function of the rate of rise of the surge voltage the turn on circuit 11 triggers thyristor 10 into conduction, whereupon the diverting circuit 7 is connected across the D-C bus. This enables the surge current to flow through the parallel paths forming the diverting circuit (i.e., one path being the buffer capacitor 8 and the other path being the series circuit of non-linear resistor 9 and thyristor 10), thereby building up voltage on the diverting circuit. The build-up of voltage on the diverting circuit has the effect of decreasing the magnitude of the surge-produced-current flowing through the bus and the non-linear resistor acts to dissipate the surge energy. When the commutating circuit capacitor voltage is above a preselected level and the bus voltage has dropped below a predetermined level the triggering circuit 16 triggers the commutating thyristor 13 into conduction. This action enables the capacitor in the oscillatory circuit to discharge through the diverting circuit thyristor 10 to turn it off. The surge current ceases flowing through the non-linear resistor and diverting circuit thyristor path but continues to flow through the buffer and commutating capacitors until it is fully charged at which time no further surge current will flow therethrough.

The above described action limits the surge voltage to a predetermined level and dissipates its energy. If excessive line-side inductive energy remains in the system after the diverting circuit thyristor is turned off the voltage which builds up on the buffer capacitor will exceed the triggering voltage level of the turn-on circuit 11. As such, the entire operation as described above will be repeated until the voltage which finally appears on the buffer capacitor is lower than the turn on circuit triggering level.

In accordance with one aspect of my invention the voltage level at which the turn-on circuit operates decreases as the rate of rise of the voltage surge increases. In the presence of slow rising surges the turn on circuit operates at a maximum voltage level. This action precludes operation of the turn on in response to low magnitude surges which do not warrant suppression. By suitably choosing the minimum voltage level at which the turn on circuit should operate in the presence of the fastest expectable rising voltage surge voltage overshoot on the non-linear resistor can be minimized, thereby protecting the thyristors in the static switch from over-voltage induced damage. For example, in a 600 volt D-C power system including a static switch composed of thyristors having a breakdown voltage rating of 1400 volts and wherein the maximum rate of rise of exceptable voltage surges is approximately 3 volts per microsecond (which surges occur when the static switch trips in response to a short circuit fault condition) and the minimum rate of rise of such voltage surges is less than 0.3 volt per microsecond (which surges occur when the static switch is manually opened), I have found that for the fastest rising surges the turn on circuit should operate at approximately 950 volts and the operating voltage level should increase to approximately 1200 volts for the slowest rising surges. This action will effectively limit voltage overshoot on the non-linear resistor to below 1400 volts, thereby protecting the static switch thyristors from overvoltage breakdown.

To accomplish that end the turn on circuit includes a frequency dependent attenuator. As can be seen the attenuator comprises resistors 18 and 19 which are connected to from a resistance-voltage divider whose input is provided across the series connection of both resistors and whose output is provided across resistor 19. The attenuator also comprises capacitors 20 and 21 connected to form a capacitive voltage divider whose input is provided across the series connection of both capacitors and whose output is provided across capacitor 21. The inputs of both voltage dividers are connected in parallel with one another and form the input of the attenuator 17. The input of the attenuator is provided with a voltage appearing across the diverting circuit 7 which is approximately equal to the surge voltage (neglecting the slight forward voltage drop of diode 6). The outputs of both dividers are connected in parallel with one another and form the output of the attenuator.

The attenuator is operative to attenuate the voltage appearing at its input and to provide the attenuated voltage at its output. The voltage appearing at the output of the attenuator is detected by means which will be described later, and if it exceeds a preselected level it results in the tripping of the diverting circuit thyristor 10. The degree of attenuation of the input voltage by attenuator 17 (i.e., the amount that the magnitude of the input voltage is decreased by the attenuator) is a function of the rate of rise of the voltage appearing at the attenuator input: the greater the rate of rise of the input voltage the lower the degree of attenuation.

As should be appreciated, in the presence of fast rising surges the degree of attenuation of attenuator 17 will be primarily established by the capacitor-voltage divider whereas for surges of slower rates of rise the degree of attenuation will be primarily established by the resistor-voltage divider. The values of the resistors and the capacitors should be carefully chosen so that the degree of attenuation for fast rising surges is slightly less than, i.e., approximately 80 percent of, the degree of attenuation for slower rising surges. In so doing the attenuator enables the turn-on circuit to operate at higher voltage levels for slower rising surges than for fast rising surges, which action precludes conduction of the diverting thyristor in the presence of very low magnitude voltage surges which present no danger to the system and which do not warrant suppression by the surge suppressor. To that end, when utilized in power systems like the example given previously, the values of the components making up the attenuator are as follows:

resistor 18 — 100 K ohm,
resistor 19 — 4.4 K ohm,
capacitor 20 — .006 microfarads
capacitor 21 — .12 microfarads The output of the attenuator is coupled to level sensitive means comprising a four-layer-breakdown diode 22. One side of diode 22 is connected to the attenuator output and the other side of the breakdown diode is connected to an inductor 23 and to one side of a resistor 24. The other side of resistor 24 is connected to a diode 25 which in turn is connected to the control or gate electrode of thyristor 10.

When the output voltage of the attenuator attains the breakdown voltage level (e.g., 50 volts) of diode 22, current commences flowing through the diode 24, whereupon, by means of the illustrated gate electrode, thyristor 10 is caused to turn on or become conductive. Resistor 24 is provided to limit the current flowing into the gate of thyristor 10 and diode 25 is provided to prevent the gate-to-cathode voltage which is generated in the thyristor 10 as it turns on from causing the breakdown diode to breakdown in the reverse direction. The inductor 23 is provided such that it and capacitor 21 form an oscillatory circuit which begins to oscillate when diode 22 breaks down. The resulting oscillation effectuates turn-off of the breakdown diode shortly after it beings conduction, thereby removing the triggering signal from the gate electrode of thyristor 10.

Commutating circuit 12 is provided as the means for turning off thyristor 10 when sufficient surge energy has been dissipated. Circuit 12 includes the series connection of commutating thyristor 13, inductor 14 and capacitor 15 and is connected in shunt with thyristor 10. One side of capacitor 15 is connected to the cathode of thyristor 10 and the other side of capacitor 15 is connected, via resistor 26, to the positive D-C bus 3. When connected thusly, capacitor 15 is charged by the D-C bus via resistor 26.

The inverse parallel combination of commutating thyristor 13 and diode 27 form a bidirectional solid state switch. In order to protect the bidirectional switch from excessive $dv/dt$, the switch is shunted by protective means 28 like that shown and claimed in U.S. Pat. No. 3,489,927 (Kelley Jr., et al) and assigned to the same assignee as my invention and including a main resistance-capacitance circuit, the resistance portion of which is shunted in turn by an auxiliary resistance-capacitance circuit having a much shorter time constant.

Figure 2A:
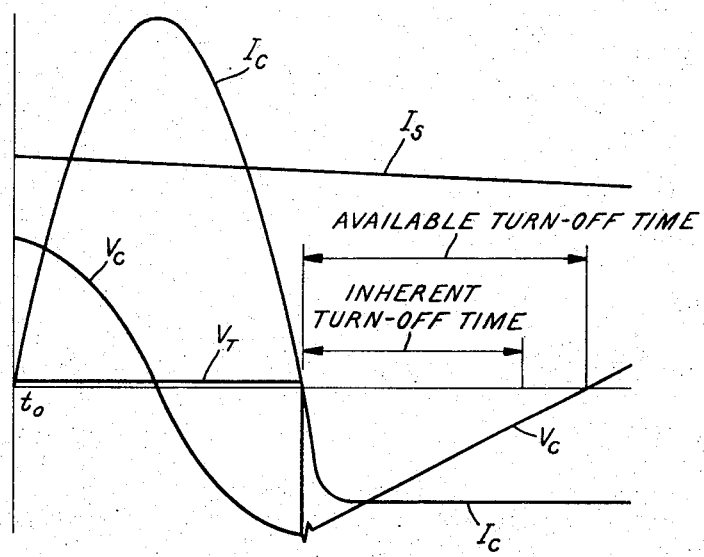
FIG. 2a is a graphical representation of the operation of a portion of my surge suppressor.

Operation of the commutating circuit and the turn-off sequence itself can best be understood with reference to the graph of FIG. 2a as well as the schematic diagram of FIG. 1. It will be understood that the turn-off sequence begins when the commutating thyristor 13 is triggered after an appropriate period of conduction by the main thyristor 10. My improved means 16 for providing the trigger signal for thyristor 13 will be described soon hereinafter. In FIG. 2 it is assumed that this signal occurs at time $T_0$, whereupon the commutating thyristor begins conducting and energy previously stored in the charged commutating capacitor 15 begins discharging therefrom. The commutating capacitor and the inductor 14 form an oscillatory circuit so that the current $I_C$ discharging from the commutating capacitor 15 is oscillatory in nature. The first half cycle of the oscillatory current will flow anode-to-cathode through the conducting thyristor 10 via the series path of the commutating thyristor 13, inductor 14 and capacitor 15. The voltage appearing on thyristor 10 is denoted as $V_T$. As the current reverses (i.e., during the next half cycle of oscillatory current $I_C$ the net anode-to-cathode current through thyristor 10 will drop below the holding level whereupon the device will begin to turn off. At the time that the thyristor 10 ceases conducting the voltage appearing on the commutating capacitor 15 (denoted as $V_C$) will be approximately equal to its maximum negative value and will also appear on the thyristor 10 in the reverse direction (i.e., cathoderto-anode). Immediately thereafter, the commutating capacitor begins recharging to its original polarity from the remaining surge current $I_s$ flowing via a diode 27 which is connected in shunt with commutating thyristor 13 but is poled in opposition thereto. A short time after the voltage on the capacitor 15 becomes positive the turned off thyristor 10 will be forward biased again.

At the time thyristor 10 ceases conducting, surge current begins flowing into the buffer capacitor 8. In the case of a relatively low energy surge (e.g., a surge resulting from a non-faulted opening of the static switch) the buffer capacitor will not charge to the turn-on circuit triggering level before it blocks the passage of further current therethrough. If the surge energy is however relatively high (e.g., a surge resulting from the static switch opening in response to a short circuit in the load) the buffer capacitor may charge to the trigger level of circuit 10 whereupon the entire surge suppressing operation as has been previously described will reoccur.

The time it takes for the commutating capacitor to charge to the positive polarity during the turn on sequence is referred to as the "available turn off time". So long as the available turn off time is longer than the inherent turn off time of the thyristor 10 it will remain off notwithstanding the reapplication of forward bias thereto. My triggering circuit 16 for the commutating thyristor 13 assures that result.

In a solid state surge suppressor having a surge current diverting circuit made up of an energy dissipating element (e.g., non-linear resistor 9) in series with a thyristor, it is of utmost importance to ensure that once the thyristor begins to turn off it does turn off and remains off until it is subsequently retriggered. Should the thyristor fail to remain off (i.e., become conductive as soon as forward voltage is applied thereto) it will reconnect the diverting circuit to the power bus thereby resulting in a power drain from the system power supply.

To accomplish the above noted objective, my turn-off circuit monitors certain system conditions which will materially affect the time at which forward voltage is reapplied to thyristor 10 (i.e., the available turn off time) during the turn off sequence. To best illustrate those conditions reference should be made to FIG. 2 which are graphical representations of voltages and currents flowing in selected parts of the surge suppressor during the turn off sequence.

Should the voltage appearing on the commutating capacitor at the beginning of a turn off sequence be too low, the magnitude of oscillatory current $I_c$ available for driving the current through thyristor 10 below the holding level may be insufficient for that task and the thyristor will not begin to turn off.

Figure 2B:
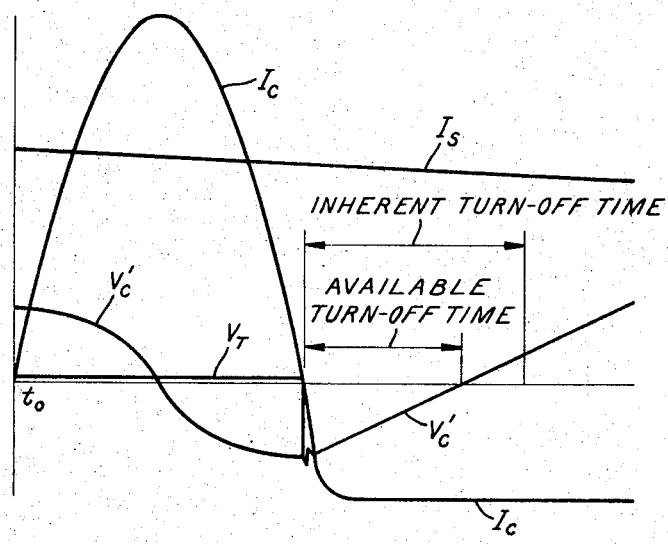
FIG. 2b is a graphical representation of a condition which my invention obviates.

Even if the potential $V_C$ on capacitor 15 is of sufficient magnitude to ensure that the current through thyristor 10 is driven below its holding level the capacitor voltage may be too low to ensure that the thyristor will remain off when forward voltage is reapplied thereto. This condition is shown graphically in FIG. 2b. As can be seen therein the voltage $V'_C$ (which represents the voltage on capacitor 15 and is of a low magnitude than the voltage $V_C$ shown in FIG. 2a) will reach positive polarity prior to voltage $V_C$, notwithstanding that the rate of charge of capacitor 15 in the conditions shown in FIG. 2a and 2b is the same (the rate of charge is directly proportional to the magnitude of the surge current $I_s$ flowing through diode 27) since the maximum negative excursion of voltage $V'_C$ is less than the corresponding excursion of voltage $V_C$. The oscillatory circuit is lightly damped. The maximum negative excursion of voltage $V'_C$ is approximately equal to the positive voltage to which capacitor 15 was charged at time $T_0$.

If, as the case shown in FIG. 2b, the voltage on capacitor 15 is not of sufficient magnitude to ensure that the available turn off time (i.e., the time it takes for capacitor 15 to charge from its maximum negative voltage to zero) is longer than the inherent turn off time of the device at a particular surge current level, the thyristor 10 will begin conducting when the voltage on capacitor 15 is again positive.

Figure 2C:
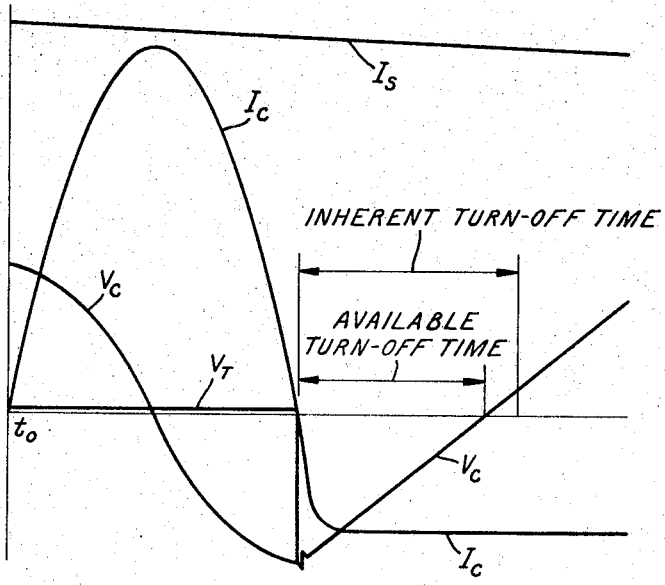
FIG. 2c is a graphical representation of a condition which my invention obviates.

Even if the voltage on the commutating capacitor is sufficiently high, if the turn off sequence is begun too soon after thyristor 10 is rendered conductive, the level of surge current flowing through the diverting circuit will be relatively high. Such a condition is shown in FIG. 2c. As can be seen therein when thyristor 10 ceases conducting the high level of surge current $I'_s$ rapidly charges commutating capacitor 15 to positive polarity from its maximum negative excursion level. The rate of which commutating capacitor 15 is charged by the high surge current remaining reduces the available turn-off time from the condition shown in FIG. 2a to that shown in FIG. 2c, whereby the available turn off time is shorter than the inherent turn off time of thyristor 10. Accordingly, in such a condition thyristor 10 will begin conducting anew as soon as the voltage on capacitor 15 is of positive polarity.

My triggering circuit 16 monitors both the magnitude of the voltage appearing on the commutating capacitor and the magnitude of the surge voltage remaining and does not trigger the commutating circuit until the voltage appearing on the commutating capacitor is above a preestablished level at a time when the magnitude of the remaining voltage surge is below a preestablished level. This action results in a reliable turn off operation. Such an operation is shown graphically in FIG. 2a.

The details of my triggering circuit which effectuate the above described ends are shown in the schematic diagram of FIG. 1. As can be seen therein, triggering circuit 16 includes two voltage dividers, 29 and 30. Voltage divider 29 is composed of resistors 31, 32, 33, 34, 35, 36, 37 and 38 and includes an input which is provided across the series combination of resistors 31–38 and an output which is provided across resistor 31. All of the resistors 31–38 are of equal value and are precision resistors to minimize the effects of temperature variations.

The input of voltage divider 29 is connected across non-linear resistor 9. The divider 29 monitors the magnitude of the non-linear resistor voltage and provides an output signal or voltage which is proportional to the instantaneous magnitude of the input voltage. The voltage appearing on non-linear resistor 9 (and hence on the input to voltage divider 29 during the period that thyristor 10 is conducting) is substantially the magnitude of the surge voltage, which voltage is a function of the magnitude of the surge current $I_s$ flowing through the surge suppressor. The output of voltage divider 29 indicates if the magnitude of the voltage surge is too high for a reliable turn-off operation.

Voltage divider 30 is composed of resistors 39 and 40 and includes an input which is provided across the series connection of resistors 39 and 40 and an output which is provided across resistor 39. The input to voltage divider 30 is connected across commutating thyristor 13. As should be appreciated, when thyristor 10 is conducting the voltage appearing anode-to-cathode on commutating thyristor 13 will be the voltage to which commutating capacitor 15 is charged. Accordingly, voltage divider 30 will monitor the voltage appearing on capacitor 15. The signal or voltage appearing at the output of voltage divider 30 is proportional to the magnitude of the voltage on capacitor 13. A zener diode 41 is connected in shunt with the output of voltage divider 30 to limit or clamp the voltage appearing thereat to a fixed value whenever the input voltage on the voltage divider (i.e., the voltage on capacitor 15) is at a sufficient magnitude to effectuate reliable thyristor turn-off.

Circuitry 42 is provided coupled to the outputs of the voltage dividers 29 and 30 for comparing the voltages appearing at their respective outputs and for triggering thyristor 13 whenever the clamped voltage at the output of divider 30 exceeds the voltage at the output of divider 29 by a predetermined value. To that end circuitry 42 includes a capacitor 43 connected in shunt with zener diode 41, a four-layer-breakdown diode 44 having one side connected to one side of capacitor 43 and the other side connected to one side of primary winding 45 of a pulse transformer. The other side of the transformer primary is connected to the anode of diode 46. The cathode of diode 46 is connected to one side of capacitor 47 shunting the output of voltage divider 29. The transformer includes a secondary winding 48 which is connected across the gate and cathode electrodes of the commutating thyristor 13.

Capacitor 43 charges to the clamp voltage appearing at the output voltage divider 30 and this voltage appears at one side, denoted as side A, of breakdown diode 44. The output voltage of voltage divider 29 is coupled via capacitor 47, diode 46 and transformer primary 45 to the other side, denoted as side B, of the breakdown diode. When the voltage appearing on side B of diode 44 exceeds the voltage on side A by the inherent breakdown voltage of the diode, the diode begins to conduct, whereupon energy stores in capacitor 43 discharges through the temporary impedance path composed of breakdown diode 44, primary winding 45, diode 46 and capacitor 47. The discharging current through primary winding 45 results in current being supplied to the gate of thyristor 10 to render it conductive, thereby initiating commutation or turn off of diverting circuit thyristor 10.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In an electric system for supplying D-C power from a voltage source to an electric load, a solid-state voltage surge suppressor connected across said source for limiting the magnitude of voltage surges to a predetermined maximum and for dissipating their energy, said suppressor comprising:
   a. non-linear resistance means having a negative current-resistance characteristic;
   b. normally non-conductive controllable electric switch means connected in series circuit relationship with said non-linear resistance means;
   c. triggering means operative in response to a voltage surge across said series circuit for rendering said electric switch conductive when the potential of said surge attains a preselected level which is is a function of the rate of rise of said surge, said triggering means comprising:
      i. frequency dependent attenuating means, having an input and an output, for attenuating a voltage provided at its input which represents the voltage across said series circuit to provide an output voltage of reduced magnitude at said output, the degree of attenuation of said input voltage decreasing as the rate of rise of the input voltage increases, said attenuating means comprising a resistor-composed-voltage divider connected in parallel with a capacitor-composed-voltage divider, the values of the resistors and capacitors in said attenuating means being such that the degree of attenuation for a fast rising input voltage is slightly less than the degree of attenuation for a slow rising input voltage; and
      ii. level sensitive means coupled to the output of said variable attenuating means for rendering said switch means conductive when the output voltage reaches a preestablished level; and
   d. turn-off means for automatically causing said electric switch means to cease conducting.

2. The suppressor as specified in claim 1 wherein the degree of attenuation for a fast rising input voltage is approximately 80 percent of the degree of attenuation for a slow rising input voltage.

3. The suppressor as specified in claim 2 wherein said electric switch means comprises a thyristor.

4. In an electric system for supplying D-C power from a voltage source to an electrical load, a solid state surge suppressor connected across said source for arresting surges in the system while limiting such surges to a predetermined maximum, said suppressor comprising:
   a. non-linear resistance means having a negative current-resistance characteristic;
   b. a normally non-conductive thyristor connected in series circuit relationship with said non-linear resistance means, said thyristor being rendered conductive in automatic response to a voltage surge across the series circuit;
   c. means for automatically causing said thyristor means to cease conducting comprising:
      i. an oscillatory circuit including a capacitor and an inductor connected in shunt with said thyristor via a normally non-conductive electric switch; and ii. triggering means for rendering said electric switch conductive when the magnitude of the voltage surge drops below a first preselected level if the voltage appearing on the capacitor of the oscillatory circuit is above a second preselected level.

5. The suppressor as specified in claim 4 wherein said triggering means comprises first means for providing a first signal which is a function of the instantaneous magnitude of the surge, second means coupled to said oscillatory circuit capacitor for providing a second signal whenever the voltage on said capacitor is above said second preselected level and third means coupled to said first and second detector means for rendering said switch conductive whenever the second signal exceeds the first signal by a preestablished value.

6. In an electrical system for supplying D-C power from a voltage source to an electrical load, a solid state surge suppressor connected across said voltage source for arresting surges in the system while limiting such surges to a predetermined maximum, said suppressor comprising:
 a. non-linear resistance means having a negative current-resistance characteristic;
 b. a normally non-conductive thyristor connected in series with said non-linear resistance means, said thyristor being rendered conductive in automatic response to the existence of a surge in said system;
 c. first triggering means operative in response to the presence of a surge for providing a trigger signal to render said thyristor conductive, said triggering means comprising:
  i. frequency dependent attenuating means, having an input and an output, for attenuating a voltage provided at its input which represents the voltage across said series circuit to provide an output voltage at said output, the degree of attenuation of said input voltage decreasing as the rate of rise of the input voltage increases, said attenuating means comprising a resistor composed voltage divider connected in parallel with a capacitor composed voltage divider, the valves of the resistors and capacitors in said attenuating means being such that the degree of attenuation for a fast rising input voltage is slightly less than the degree of attenuation for a slow rising input voltage; and
  ii. level sensitive means coupled to the output of said voltage dividing means for providing said trigger signal when the attenuated output voltage reaches a preestablished level; and
 d. automatic means for causing said first thyristor to cease conducting comprising:
  i. an oscillatory circuit including a capacitor and an inductor connected in shunt with said thyristor via a normally non-conductive electric switch; and
  ii. second triggering means for rendering said electric switch conductive when the magnitude of the surge drops below a first preselected level if the voltage appearing on the capacitor of the oscillatory circuit is above a second preselected level.

7. The suppressor as specified in claim 6 wherein the degree of attenuation for a fast rising input voltage is approximately 80% of the degree of attenuation for a slow rising input voltage.

8. The suppressor as specified in claim 6 wherein said second triggering means comprises first means detector for providing a first signal which is a function of the instantaneous magnitude of the surge, second means coupled to said oscillatory circuit capacitor for providing a second signal whenever the voltage on said capacitor is above said second preselected level and third means coupled to said first and second means for rendering said switch conductive whenever the second signal exceeds the first signal by a preestablished value.

* * * * *